(12) United States Patent
Sharma et al.

(10) Patent No.: US 8,762,196 B2
(45) Date of Patent: Jun. 24, 2014

(54) SYSTEMS AND METHODS FOR OPTIMIZING MICROGRID CAPACITY AND STORAGE INVESTMENT UNDER ENVIRONMENTAL REGULATIONS

(75) Inventors: Ratnesh Sharma, Fremont, CA (US); Yanyi He, Ames, IA (US)

(73) Assignee: NEC Laboratories America, Inc., Princeton, NJ (US)

( * ) Notice: Subject to any disclaimer, the term of this patent is extended or adjusted under 35 U.S.C. 154(b) by 123 days.

(21) Appl. No.: 13/543,819

(22) Filed: Jul. 7, 2012

(65) Prior Publication Data
US 2013/0024243 A1    Jan. 24, 2013

Related U.S. Application Data

(60) Provisional application No. 61/509,641, filed on Jul. 20, 2011.

(51) Int. Cl.
*G06Q 10/00* (2012.01)
(52) U.S. Cl.
USPC ............................................. 705/7.36
(58) Field of Classification Search
CPC .................. G06Q 10/063; G06Q 10/0637
USPC ........................................ 705/7.36
See application file for complete search history.

(56) References Cited

U.S. PATENT DOCUMENTS

| 6,311,102 B1 * | 10/2001 | Minakami ..................... 700/217 |
| 8,204,809 B1 * | 6/2012 | Wise ............................... 705/35 |
| 2008/0167064 A1 * | 7/2008 | Bar-Ness et al. ............ 455/522 |
| 2010/0057582 A1 * | 3/2010 | Arfin et al. ..................... 705/26 |
| 2010/0076613 A1 * | 3/2010 | Imes ............................. 700/287 |
| 2011/0071857 A1 * | 3/2011 | Malov et al. ..................... 705/4 |

OTHER PUBLICATIONS

Asano et al, Methodology to Design the Capacity of a Microgrid, IEEE 2007.
Mohamed et al, Power Management Strategy for Solving Power Dispatch Problems in MicroGrid for Residential Applications, 2010 IEEE International Energy Conference.
Zhang et al, Optimal Energy Management of Hybrid Power System with Two-Scale Dynamic Programming, 2011 American Control Conference on O'Farrell Street, San Francisco, CA, USA Jun. 29-Jul. 1, 2011.
Farag et al, Economic Load Dispatch Multiobjective Optimization Procedures Using Linear Programming Techniques, IEEE Transactions on Power Systems, vol. 10, No. 2, May 1995.
Talaq et al, A Summary of Environmental/Economic Dispatch Algorithms, IEEE Transactions on Power Systems, vol. 9, No. 3, Aug. 1994.
Li et al, Optimization and Analysis of Operation Strategies for Combined Cooling, Heating and Power System, IEEE 2011.

* cited by examiner

*Primary Examiner* — Thomas Dixon
(74) *Attorney, Agent, or Firm* — Joseph Kolodka

(57) ABSTRACT

Systems and methods are disclosed to method to determine capacity planning under environmental constraints by generating an integrated economic planning model for a decision maker, a utility company and one or more microgrids; maximizing the microgrids' total profit and minimizing the electricity price designed by the utility company; generating proactive strategies for the utility company to comply with the environmental policies, and planning strategies for microgrids to help utility company abate environmental mission; and applying different characteristics of microgrids to invest in different portfolio of renewable energy through gaming simulations.

21 Claims, 3 Drawing Sheets

SYSTEMS AND METHODS FOR OPTIMIZING MICROGRID CAPACITY AND STORAGE INVESTMENT UNDER ENVIRONMENTAL REGULATIONS

The present application claims priority to Provisional Application Ser. No. 61/509,641 filed Jul. 20, 2011, the content of which is incorporated by reference.

BACKGROUND

Distributed generation facilities such as microgrids are growing fast to support the local demand in rural and urban areas. A microgrid is a group of distributed energy resources within clearly defined boundaries that acts as a single controllable entity with respect to the grid. As the name suggests, microgrids are highly independent power subsystems comprising of diverse generation technologies that associate with the load. The microgrid operators are capable of investing in new technologies, applying demand management to the load, and selling the spare energy to the nearby utility company. A microgrid can contribute to the generation portfolio, carbon emissions and load curtailment subtly.

In a parallel trend, energy from renewable sources is becoming one of the most requisite energy, and the environmental policies are being implemented to encourage renewable energy investment. The utility company is usually the first entity to comply with the environmental regulations. However, restricted to the availability of resources, for instance, wind farm requires a large rural area, the utility company may find it difficult to accomplish the regulations. Another barrier is that the investment cost of renewable energy is much higher than other sources of energy. One of the possible ways of compensating the cost of renewable energy is to set up an energy market, in which the utility company can buy the energy from the market and microgrid operators can sell the energy in the market. The electricity price can be a form of compensation. The energy market formed by the utility company becomes a platform to promote renewable energy from microgrids with different characteristics. For example, some microgrids are rich in wind while other microgrids may have favorable sunshine most of the time. Promoting renewable energy is a long term mission. Therefore, long term investment planning of microgrids is critical to maintain economic and environmental sustainability.

SUMMARY

Systems and methods are disclosed to method to determine capacity planning under environmental constraints by generating an integrated economic planning model for a decision maker, a utility company and one or more microgrids; maximizing the microgrids' total profit and minimizing the electricity price designed by the utility company; generating proactive strategies for the utility company to comply with the environmental policies, and planning strategies for microgrids to help utility company abate environmental mission in a long planning term; and applying different characteristics of microgrids to invest in different portfolio of renewable energy through gaming simulations.

Advantages of the preferred embodiments may include one or more of the following. The system can provide investment and operation guidance for microgrid operators (MGO) to optimize their profits in a competing market formed by the utility company, subject to environmental policies. The system aids environmental concerns in power generation and distribution systems and contribute to policies that incentivize investment in low-carbon or renewable technologies. Microgrid (MG), as a subsystem with generation and associated loads, participates in the environmental policies administered by the utility companies. The system is focused on building an integrated economic planning model for decision/policy makers, utility company and microgrids. The utility company is the dominant decision maker in this model and is capable of manipulating the microgrid operators' decisions. This economic model emphasizes on maximize the microgrids' total profit and minimizing the electricity price designed by the utility company. The model is built to provide proactive strategies for the utility company to comply with the environmental policies, and planning strategies for microgrids to help utility company abate the environmental mission in a long planning term. Inside the framework, the utility company can utilize different characteristics of microgrids to invest in different portfolio of renewable energy by playing Stackelberg game. The electricity price in the energy market is a compensation for investing in expensive renewable technologies. At the lower level of microgrid's optimization problem, hourly operation is also considered to capture the storage investment. The investment decision of one microgrid is not only constrained by energy market demand, also affected by other microgrids. The microgrid operators play Nash game throughout the planning horizon. The system also includes storage planning and generator planning. In the past storage planning has only been addressed for short term with fixed generators. Generation planning and storage planning is believed to be a challenging for computation. In this work, typical seasons or typical days are considered to address the impacts of storage. The final storage state of a season is also fixed to be zero.

DESCRIPTION

Figure 1:
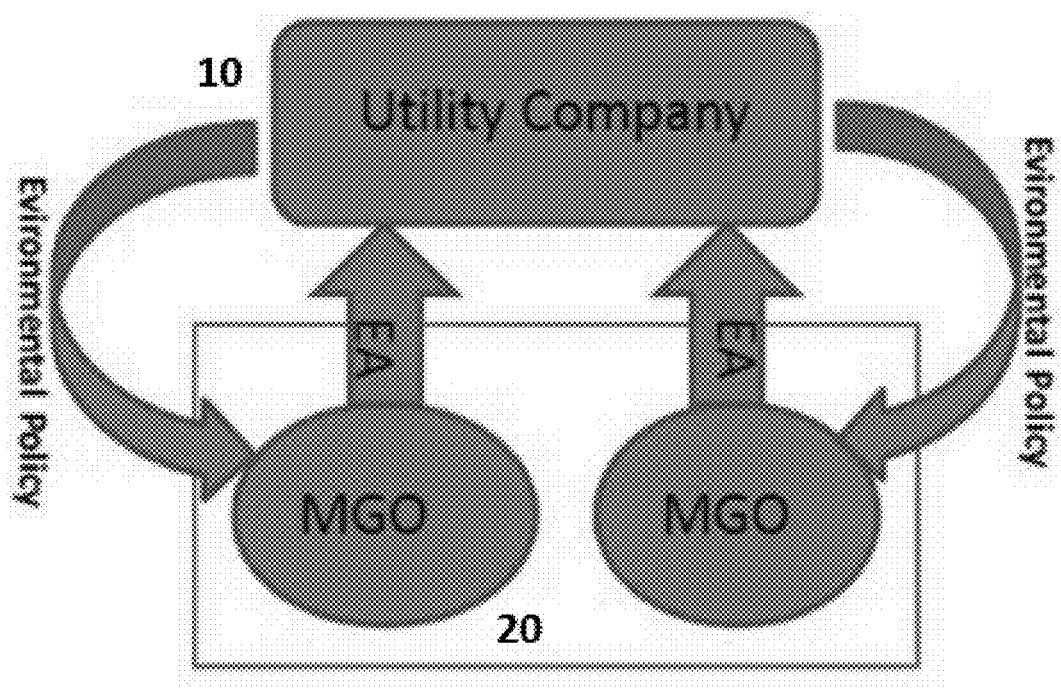
FIG. 1 shows an exemplary framework for interactions between a utility company and one or more microgrid operators (MGOs).

FIG. 1 shows an exemplary framework for interactions between a utility company 10 and one or more microgrid operators (MGOs) 20. In this framework, the utility company is willing to utilize the microgrids' merits to abate its burden of investing in renewable energy. As shown in FIG. 1, the utility company constructs the energy arbitrage market to allow the microgrids to sell the energy to the grid. The utility company is physically connected to multiple microgrids through a low voltage distribution network. However, without sufficient economic benefits, the microgrid operators may not invest in renewable energy and sell to the utility company. The utility company determines an electricity price that includes incentives to encourage investment in renewable energy. In addition, the utility company also determines the market size to balance the insufficient amount of renewable energy or vulnerability of high penetration of renewable energy. The microgrid operators are heading to a state where it can satisfy the internal load and also maximize the profit by selling energy to the utility company over a long planning period. In sum, the microgrid operators are playing a Nash game in the market. The utility company has to figure out the minimal incentives.

Figure 2:
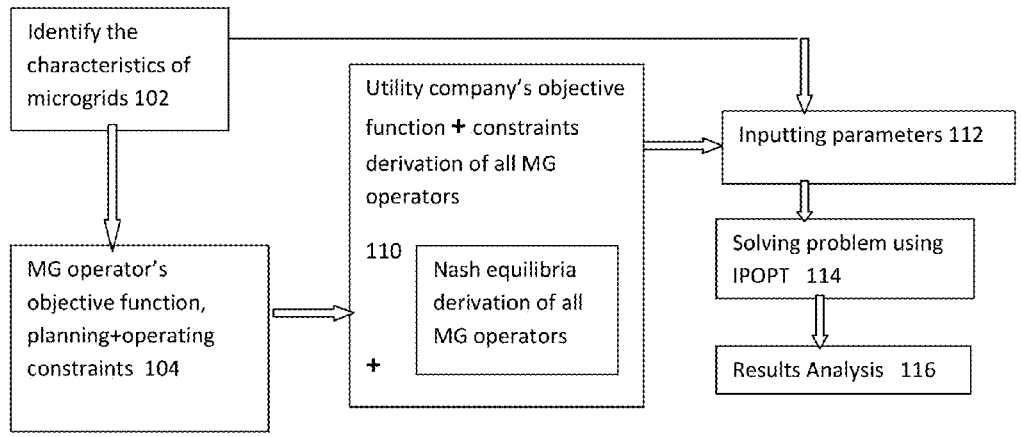
FIG. 2 shows an exemplary model that can provide strategic guidance to multiple microgrid operators to maximize their economic profit in a competing market formed by the utility company, subject to environmental policies.

FIG. 2 shows an exemplary framework that can provide strategic guidance to multiple microgrid operators to maximize their economic profit in a competing market formed by the utility company, subject to environmental policies. The microgrids are interdependent, and communicate with each other in the market. The utility company is capable of regulating the communication. The system not only addresses the economic operation of the microgrids, but also emphasizes on the long term responses and planning decisions of the microgrids.

Turning now to FIG. 2, the framework identifies characteristics of micro-grids (102). The framework also identifies the microgrid operator (MGO)'s objective function, planning and operating constraints 104. The information from 104 is then combined in unit 110 where the utility company's objective function and constraint derivation of all MGOs are processed. The system includes a module that provides Nash equilibria derivation of all MGOs. Data from modules 102 and 110 are provided to an input parameter unit 112. The framework solves the problem using a suitable solver such as IPOPT (114) and the results can be analyzed (116).

In one embodiment of the framework of FIG. 2, the characteristics of microgrids are specified. The characteristics include the microgrid's electricity and heat load profiles, generators, potential expansion capacities, operating cost, investment cost and environmental regulation passed from utility company. Then, an linear programming problem of microgrid operator to maximize its long term profit is built. The objective functions include profit of selling energy to the utility company, electricity charge from residential consumers, curtailment payment, gas consumption, overnight investment cost of new generator, overnight cost of storage, generation operating cost and energy operating cost. The problem is subjected to investment constraints, curtailment constraint, demand supply balance constraints, storage charging and discharging constraints, environmental constraints, and distribution capacity constraints. We assume the incentive is given when modeling the microgrid's problem. Nash equilibria of all microgrids are derived by taking the first order necessary conditions of all microgrids' problems and combining them. In this embodiment, the utility company's objective is specified. It could be uniform price (where the price is all the same across MGs) or nonuniform price (where the prices can vary among MGs). The utility company's constraints are simply energy market demand and Nash equilibria corresponding to certain price from previous steps. The optimal solution can be obtained by modeling the numerical characteristics of microgrids, and solving the utility company's problem. The results will include both optimal incentives and Nash equilibrium of microgrids. This results will be very helpful for the utility company or microgrid operators to make decisions over a long period. The problem can be easily extended to a large scale, which includes numbers of microgrids with various characteristics and market size.

One embodiment uses IPOPT (Interior Point OPTimizer), which is a software package for large-scale nonlinear optimization. It is designed to find (local) solutions of mathematical optimization problems of the from $$\min f(x)$$

$$x \text{ in } R^n$$

$$\text{s.t. } g\_L <= g(x) <= g\_U$$

$$x\_L <= x <= x\_U$$

where $f(x): R^n \to R$ is the objective function, and $g(x): R^n \to R^m$ are the constraint functions. The vectors $g\_L$ and $g\_U$ denote the lower and upper bounds on the constraints, and the vectors $x\_L$ and $x\_U$ are the bounds on the variables $x$. The functions $f(x)$ and $g(x)$ can be nonlinear and nonconvex, but should be twice continuously differentiable. Equality constraints can be formulated in the above formulation by setting the corresponding components of $g\_L$ and $g\_U$ to the same value. Ipopt is written in C++ and is released as open source code under the Eclipse Public License (EPL). It is available from the COIN-OR initiative. The IPOPT distribution can be used to generate a library that can be linked to one's own C++, C, or Fortran code, as well as a solver executable for the AMPL modeling environment. The package includes interfaces to CUTEr optimization testing environment, as well as the MATLAB and R programming environments.

Figure 3:
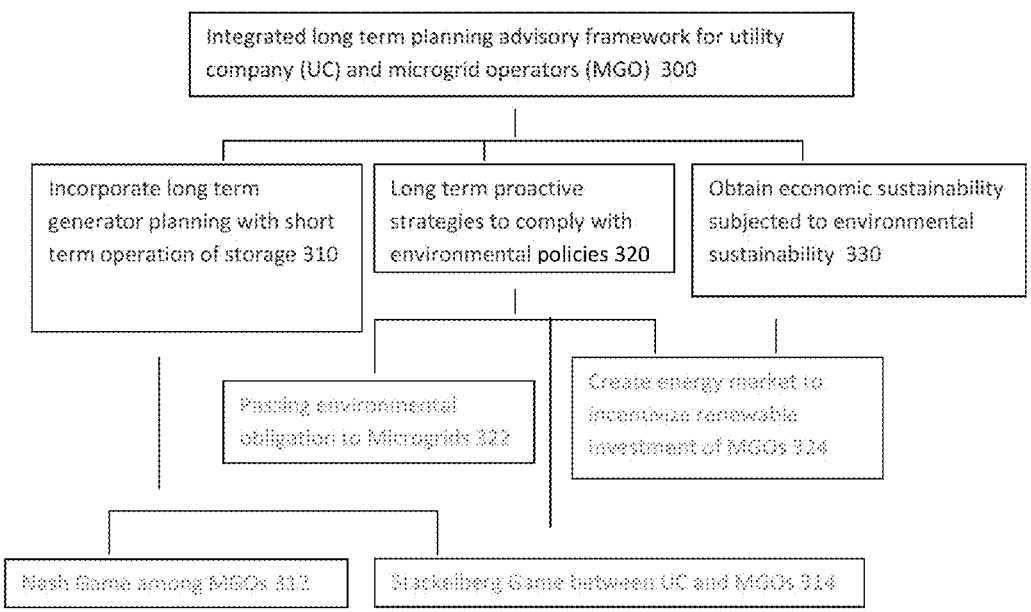
FIG. 3 shows an exemplary process supported by the framework of FIG. 2.

FIG. 3 shows an exemplary process supported by the framework of FIG. 2. The process includes an integrated long term planning advisory framework for utility company and MGOs (300). The process includes performing long term generator planning with short term operating of MGOs for storage investment (310). In turn, this operation includes simulating a Nash Game among the MGOs (312) and simulating a Stackelberg Game between the utility company and MGOs (314).

The process also includes generating long term proactive strategies to comply with environmental policies (320). This operation includes passing environmental obligations to the MGOs (322), simulating a Stackelberg Game between the utility company and MGOs (314) and creating an energy market to incentivize renewable investment of MGOs (324).

The process also includes determining economic sustainability subjected to environmental sustainability (330). This includes creating energy market to incentivize renewable investment of MGOs (324).

The system is focused on building an integrated economic planning model for decision/policy makers, utility company and microgrids. The utility company is the dominant decision maker in this model and is capable of manipulating the microgrid operators' decisions. This economic model emphasizes on maximize the microgrids' total profit and minimizing the electricity price designed by the utility company. The model is built to provide proactive strategies for the utility company to comply with the environmental policies, and planning strategies for microgrids to help utility company abate the environmental mission in a long planning term. Inside the framework, the utility company can utilize different characteristics of microgrids to invest in different portfolio of renewable energy by playing Stackelberg game. The electricity price in the energy market is a compensation for investing in expensive renewable technologies. At the lower level of microgrid's optimization problem, hourly operation is also considered to capture the storage investment. The investment decision of one microgrid is not only constrained by energy market demand, also affected by other microgrids. The microgrid operators play Nash game throughout the planning horizon.

The system also includes storage planning and generator planning. In the past storage planning has only been addressed for short term with fixed generators. Generation planning and storage planning is believed to be a challenging for computation. In this work, typical seasons or typical days are considered to address the impacts of storage. The final storage state of a season is also fixed to be zero.

The system uses a mathematical model that represents the Nash game among MGOs, as well as the leader-follower game between the utility company and MGOs, with regard to environmental regulations, long term economic investment and operation. In this model, the microgrid operator's profit optimization problem can be restated as:

$$\max_f \sum_{n,sn,h} \{P^U \cdot e^u + P^{eg} \cdot e^g - P^c \cdot c^e - OCG \cdot g\} - \sum_{i,n} FC \cdot \Delta X - \quad (1)$$

$$\sum_n FC^s \cdot \Delta STG - \sum_{n,sn,h,i} OC \cdot x - \sum_{n,sn,h,} OC^s \cdot (E_c + E_d)$$

$$s.t. \, c^e \leq 10\% \, L^e \, (\alpha) \quad (2)$$

$$x \leq CF \cdot \left(X^0 + \sum_1^n \Delta x(n, i, f)\right) \, (\beta) \quad (3)$$

$$\sum_n \Delta x \leq \Delta x^{MAX} \, (\gamma) \quad (4)$$

$$STG(h) \leq STG(h-1) + (\rho_c E_c - E_d/\rho_d) \, (\eta) \quad (5)$$

$$STG \leq STG^0 + \sum_1^{n,sn} \Delta STG(n, sn, f) \, (\delta) \quad (6)$$

$$\sum_i x - (E_c - E_d) \geq \sum_i e^u + e^g \, (\lambda) \quad (7)$$

$$e^g = L^c - c^e \, (\mu) \quad (8)$$

$$L \leq gas + TC \cdot x^{CHP} \, (\nu) \quad (9)$$

$$x \geq e^u \, (\omega) \quad (10)$$

$$\sum_i eu \leq LCAP \, (\kappa) \quad (11)$$

$$\sum_i EmiR \cdot e^u \leq CNT \, (\sigma) \quad (12)$$

$$STG(f, n, sn, H) = 0 \, (\tau) \quad (13)$$

$$e^u, c^e, e^g, E_c, E_d, \Delta x, \Delta STG, x \geq 0 \quad (14)$$

where:

| | |
|---|---|
| F | set of microgrid operators, g, f ∈ F. |
| N | set of periods, n ∈ N. |
| I | set of power generation types of technologies, i ∈ I. |
| SN | set of subperiods, sn ∈ SN. |
| H | set of hours, h, H ∈ H, H is the final hour in a season. |

Parameters:

| | |
|---|---|
| $L^e$(n, sn, h, f) | electricity demand in microgrid f at hour h in subperiod sn and period n |
| $L^h$(n, sn, h, f) | heat demand in microgrid f at hour h in subperiod sn and period n |
| $X^0$(i, f) | existing capacity of generation technology type i own by microgrid f |
| $STG^0$(f) | existing storage capacity of microgrid f |
| FC(i) | fixed cost or overnight cost of technology i. |
| $FC^s$ | fixed cost or overnight cost of storage. |
| OC(i) | operation and maintenance cost of technology i |
| $OC^s$ | operation and maintenance cost of storage |
| OCG | gas price |
| CF(i, n, sn, h) | capacity factor of technology i at hour h in period n and subperiod n |
| $P^{eg}$(n, sn, f) | bilateral electricity price of consumers in microgrid f in subperiod sn and period n |
| CNT(n, f) | emission cap of microgrid f in period n |
| $P^c$(n, sn, h, f) | curtailment payment by microgrid f at hour h in subperiod sn and period n |
| TC | natural gas turbine capacity to heat transfer coefficient |
| $\Delta X^{MAX}$(i, f) | maximal expansion capacity of technology i owned by microgrid f |
| EmiR(i) | emission rate of technology i |
| $\rho_c$ | battery or storage system charging efficiency |
| $\rho_d$ | battery or storage system discharging efficiency |
| MS(n) | electricity demand from the utility company in period n |

MGOs' Decision Variables:

| | |
|---|---|
| $c^e$(n, sn, h, f) | amount of electricity curtailment of microgrid f at hour h in subperiod sn and period n |
| $c^h$(n, sn, h, f) | amount of heat curtailment of microgrid f at hour h in subperiod sn and period n |
| g(n, sn, h, f) | gas consumption of microgrid f at hour h in subperiod sn and period n |
| Δx(i, n, f) | technology i capacity investment by microgrid f in period n |
| $h^g$(n, sn, h, f) | served heat demand by microgrid f at hour h in subperiod sn and period n |
| $e^g$(n, sn, h, f) | served electricity demand by microgrid f at hour h in subperiod sn and period n |
| STG(n, sn, h, f) | storage state at hour h in subperiod sn and period n |
| x(i, n, sn, h, f) | operation generation of technology i by microgrid f at hour h in subperiod sn and period n |
| $e^u$(n, sn, h, i, f) | amount of sales by microgrid f at hour h in subperiod sn and period n from technology i |
| $e^{us}$(n, sn, h, f) | amount of sales by microgrid f at hour h in subperiod sn and period n from storage |
| $E_c$(n, sn, h, f) | charging power at hour h in subperiod sn and period n of microgrid f |
| $E_d$(n, sn, h, f) | discharging power at hour h in subperiod sn and period n of microgrid f |
| ΔSTG(n, sn, f) | storage investment in subperiod sn and period n by microgrid operator f |

Utility Company's Decision Variables:

| | |
|---|---|
| $P^U$(n, i) | electricity price regulated by the utility company of technology i in period n in uniform price case study |
| $P^U$(f, n, i) | electricity price regulated by the utility company of technology i in period n for microgrid f in nonuniform price case study |

Dual Variables:

| | |
|---|---|
| α(n, sn, h, f) | dual variables of Constraint (2). |
| β(n, sn, h, i, f) | dual variables of Constraint (3). |
| γ(n, i, f) | dual variables of Constraint (4). |
| η(n, sn, h, f) | dual variables of Constraint (5). |
| δ(n, sn, h, f) | dual variables of Constraint (6) |
| λ(n, sn, h, f) | dual variables of Constraint (7) |

| | |
|---|---|
| μ(n, sn, h, f) | dual variables of Constraint (8) |
| ν(n, sn, h, f) | dual variables of Constraint (9) |
| ω(n, sn, h, i, f) | dual variables of Constraint (10) |
| κ(n, sn, h, f) | dual variables of Constraint (11) |
| σ(n, f) | dual variables of Constraint (12) |
| τ(n, sn, f) | dual variables of Constraint (13) |

The terms in the objective function (1) are the profit of selling energy to the utility company, electricity charge from residential consumers, curtailment payment, gas consumption, overnight investment cost of new generator, overnight cost of storage, generation operation cost and storage operation cost, respectively.

Equation (2) sets the cap of maximal load curtailment. The maximal operation generation is constrained by Equation (3). The total allowed investment is represented in Equation (4). Storage state can not exceed existing storage capacity in Equation (6). Total transmitted electricity is capped by transmission capacity in Equation (11).

Equation (7) and (10) both mean the energy supply is no less than the demand. Equation (8) and (9) are the microgrid internal demand and supply of electricity and heat, respectively. We assume the heat load is supplied by gas and combined heat and power (CHP) engine.

The storage state changes according to Equation (5)

Equation (12) is the environmental policy constraint. The cap cannot be violated. We assume the utility company is complying with carbon policy. It passes the policy to microgrids when it plans to purchase renewable power. Without Equation (12), microgrids would prefer to constructing cheaper and dirtier generators.

Equation (13) requires at the end of a season, the storage must be depleted. Since long term effect are more emphasized in the model, the storage energy will decay if it is not used. Moreover, the planning decisions are not sensitive to the final state of storage.

Equation (14) means the variables are all non negative.

The objective of the utility company is to use minimal incentive to purchase the desired quantities of electricity. Minimizing incentives can induce stable investment, especially when extrapolated to a further longer term planning. Minimizing total utility payment solution is sensitive to planning horizon and market participant numbers, which is unhealthy if extending to a larger scale or longer planning periods.

$$\min \sum_{n,sn,h,f} P^U \quad (15)$$

$$\text{s.t.} \sum_{sn,h,f,i} e^u = MS \quad (16)$$

$$e^u \in Nash equilibria of MGOs \quad (17)$$

Equation (16) sets up the market size.

Equation (17) means the energy solutions are results of the Nash game among MGOs.

Next, the Market Equilibrium is discussed. The Nash equilibria of microgrid operators are achieved by deriving the first order necessary conditions. Solving the following equations is equivalent to solve the Nash equilibria of microgrids. $( ) is condition operator. If the statement in bracket is true, it returns value 1, otherwise returns zero.

$$0 \le e^u \perp -P^U + \lambda + \omega + \kappa + EmiR \cdot \sigma \ge 0 \quad (18)$$

$$0 \le e^g \perp -P^{eg} + \mu + \lambda \ge 0 \quad (19)$$

$$0 \le c^e \perp P^c + \mu + \alpha \ge 0 \quad (20)$$

$$0 \le \Delta x \perp FC - \sum_{n,sn,h}^{N} CF \cdot \beta + \gamma \ge 0 \quad (21)$$

$$0 \le x \perp OC + \beta - \lambda - \omega + \nu \cdot TC\$(i = chp) \ge 0 \quad (22)$$

$$0 \le \Delta STG \perp FC^s - \sum_{sn+1}^{sn^{max}} \delta \ge 0 \quad (23)$$

$$0 \le STG(h) \perp \eta(h) - \eta(h+1) + \delta \ge 0 + \tau\$('h = H') \quad (24)$$

$$0 \le E_c \perp \rho_c \cdot \eta + \lambda + OC^s \ge 0 \quad (25)$$

$$0 \le E_d \perp -\rho_d^{-1} \cdot \eta - \lambda + OC^s \ge 0 \quad (26)$$

$$0 \le gas \perp OCG + \nu \quad (27)$$

$$0 \le \alpha \perp 0.1 L^e - c^e \ge 0 \quad (28)$$

$$0 \le \beta \perp CF \cdot (X^0 + \sum \Delta x) - x \ge 0 \quad (29)$$

$$0 \le \gamma \perp \Delta x^{MAX} - \sum_n \Delta x \ge 0 \quad (30)$$

$$0 \le \eta \perp STG(h-1) + \rho_c E_c - E_d/\rho_d - STG(h) \ge 0 \quad (31)$$

$$0 \le \delta \perp STG^0 + \sum \Delta STG \ge 0 \quad (32)$$

$$0 \le \omega \perp x(n, sn, h, i, f) - e^u(n, sn, h, i, f) \ge 0 \quad (33)$$

$$0 \le \kappa \perp LCAP(n) - \sum_i eu(f, n, sn, h, i) \ge 0 \quad (34)$$

$$\sum_i x - (E_c - E_d) = \sum_i e^u + e^g \quad (35)$$

$$e^g = L^e - c^e \quad (36)$$

$$gas = L^h - TC \cdot x(f, n, sn, h, 'chp') \quad (37)$$

The stationary price zone gives a good hint on the utility company's decision making. In the stationary price zone, the electricity price is very stable in a wide market size range. A stable price is very important for the utility company because it helps addressing a long term planning. A vulnerable and/or fluctuating price could increase the planning's uncertainties and risk.

Nash Equilibrium requires every player takes optimal actions at the same time, and every player should have perfect knowledge of others. Good or even precise estimation is very crucial. In real life, it is almost impossible to gather all the information without collusion among players. In one embodiment, the initial emission allowances are assigned, and not allowed to be traded among microgrids operators. Other embodiments allow the allowance purchase from the utility company. The competitions among MGOs will be intensified in the allowance market.

The system contributes to build an economic investment model for the decision makers, the utility company and microgrids, where the utility company is the dominant decision maker and is capable of manipulating the microgrid operators' decisions. The utility company has the flexibility to adjust the Nash Equilibrium of lower level microgrid optimization problems by changing the electricity price and energy arbitrage market demand. The competition among the microgrids are mainly restricted by the availability of renewable resources under certain emission caps.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 4:
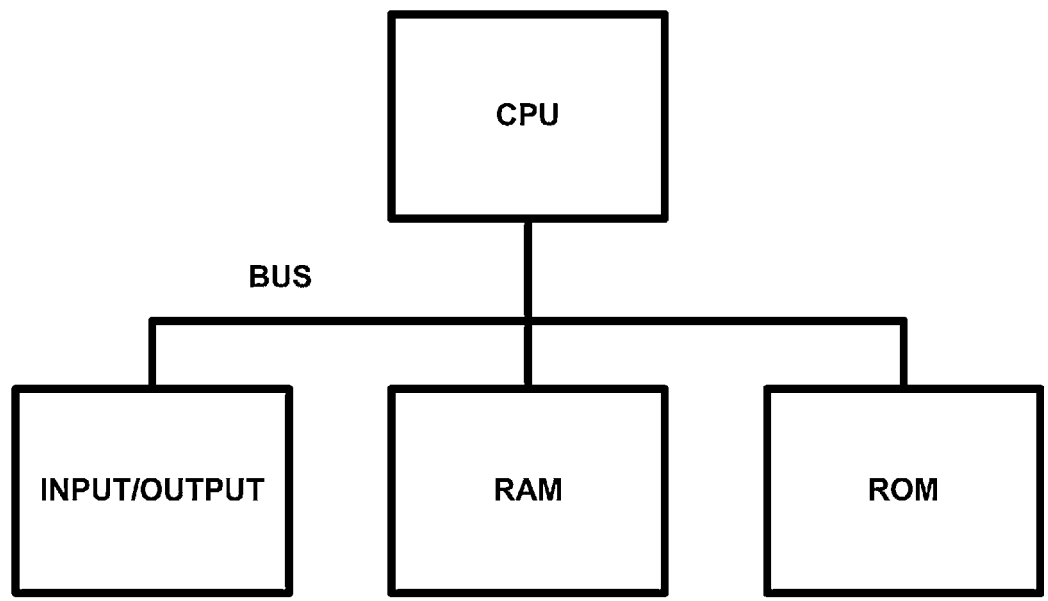
FIG. 4 shows an exemplary computer system operating the utility/MGO framework.

By way of example, a block diagram of a computer to support the system is discussed next in FIG. 4. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The system has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to determine capacity planning under environmental constraints, comprising:
generating with a computer an integrated economic planning model for one of: a decision maker, a utility company and a plurality of microgrids, wherein the utility company is physically connected to multiple microgrids through a low voltage distribution network and wherein the utility company constructs an energy arbitrage market to buy energy from the microgrids to sell the energy to the grid;
using the computer for maximizing the microgrids' total profit and minimizing electricity price designated by the utility company;
generating proactive strategies for the utility company to comply with one or more environmental policies, and planning strategies for microgrids to help utility company abate environmental mission; and
applying different characteristics of microgrids to invest in different portfolio of renewable energy and energy storage through gaming simulations.

2. The method of claim 1, comprising performing long term generator planning with short term operation of storage.

3. The method of claim 2, comprising modeling a Nash Game among the one or more microgrid operators (MGOs).

4. The method of claim 2, comprising modeling a Stackelberg Game between the utility company and microgrid operators (MGOs).

5. The method of claim 1, comprising generating long term proactive strategies to comply with environmental policies.

6. The method of claim 5, comprising passing environmental obligations to the one or more microgrid operators (MGOs).

7. The method of claim 5, comprising modeling a Stackelberg Game between the utility company and microgrid operators (MGOs).

8. The method of claim 5, comprising creating an energy market to incentivize renewable investment of microgrid operators (MGOs).

9. The method of claim 1, comprising determining economic sustainability subjected to environmental regulations including carbon cap.

10. The method of claim 9, comprising creating energy market to incentivize renewable investment of microgrid operators (MGOs).

11. A system to determine capacity planning under environmental constraints, comprising:
a processor running a framework to generate an integrated economic planning model for a decision maker, a utility company and one or more microgrids, wherein the utility company is physically connected to multiple microgrids through a low voltage distribution network and wherein the utility company constructs an energy arbitrage market to buy energy from the microgrids to sell the energy to the grid;
computer code for maximizing the microgrids' total profit and minimizing the electricity price designed by the utility company;
computer code for generating proactive strategies for the utility company to comply with the environmental policies, and planning strategies for microgrids to help utility company abate environmental mission in a long planning term; and
computer code for applying different characteristics of microgrids to invest in different portfolio of renewable energy and energy storage through gaming simulations.

12. The system of claim 11, comprising a long term generator planning with short term operation of storage.

13. The system of claim 12, comprising a Nash Game engine receiving data from microgrid operators (MGOs).

14. The system of claim 13, wherein the Nash Game engine determines:

$$\min \sum_{n,sn,h,f} P^U$$

$$\text{s.t.} \sum_{sn,h,f,i} e^u = \text{Market\_Size}$$

where $P^U$ is electricity price regulated by the utility company and $e^u \in \text{Nash\_equilibria\_of\_MGOs}$.

15. The system of claim 13, wherein the Nash Game engine determines environmental regulations, long term economic investment and operation.

16. The system of claim 12, comprising a Stackelberg Game engine processing data from the utility company and microgrid operators (MGOs).

17. The system of claim 11, comprising a module to generate long term proactive strategies to comply with environmental policies and passing environmental obligations to microgrid operators (MGOs).

18. The system of claim 15, comprising a Stackelberg Game engine to process the utility company and microgrid operators (MGOs).

19. The system of claim 15, comprising a module to an energy market to incentivize renewable investment of microgrid operators (MGOs).

20. The system of claim 11, comprising a module to determine economic sustainability subjected to environmental regulations including carbon cap.

21. The system of claim 20, comprising a module to create an energy market to incentivize renewable investment of microgrid operators (MGOs).

* * * * *